(12) United States Patent
Lau et al.

(10) Patent No.: US 10,295,768 B2
(45) Date of Patent: May 21, 2019

(54) CHIP ON LEADFRAME OPTICAL SUBASSEMBLY

(71) Applicant: Finisar Corporation, Sunnyvale, CA (US)

(72) Inventors: Wendy Pei Fen Lau, Singapore (SG); Paul Thien Vui Chia, Singapore (SG); Yunpeng Song, Freemont, CA (US); Tat Ming Teo, Singapore (SG); Yew-Tai Chieng, Singapore (SG)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 15/644,494

(22) Filed: Jul. 7, 2017

(65) Prior Publication Data

US 2018/0011267 A1   Jan. 11, 2018

Related U.S. Application Data (60) Provisional application No. 62/359,826, filed on Jul. 8, 2016.

(51) Int. Cl.
*G02B 6/42* (2006.01)

(52) U.S. Cl.
CPC ......... *G02B 6/4274* (2013.01); *G02B 6/4269* (2013.01); *G02B 6/4263* (2013.01); *G02B 6/4286* (2013.01)

(58) Field of Classification Search
CPC .. G02B 6/4263; G02B 6/4286; G02B 6/4265; G02B 6/4274
See application file for complete search history.

(56) References Cited

U.S. PATENT DOCUMENTS

| | | | | |
|---|---|---|---|---|
| 6,069,905 A * | 5/2000 | Davis | ................... | G02B 6/4204 372/103 |
| 6,491,447 B2 * | 12/2002 | Aihara | ................. | G02B 6/4214 385/89 |
| 6,567,435 B1 * | 5/2003 | Scott | .................... | G02B 6/4201 257/729 |
| 7,068,694 B2 * | 6/2006 | Yamamoto | ........... | G11B 7/1365 372/36 |
| 7,144,259 B2 * | 12/2006 | Ice | ........................ | G02B 6/4201 439/79 |
| 7,149,405 B2 * | 12/2006 | Lim | ...................... | G02B 6/4204 385/147 |
| 7,158,550 B2 * | 1/2007 | Keh | .................... | H01S 5/02212 372/34 |
| 7,182,527 B2 * | 2/2007 | Saito | .................... | G02B 6/4206 385/88 |
| 7,226,219 B2 * | 6/2007 | Warashina | ............ | H01L 25/167 257/684 |
| 7,341,385 B2 * | 3/2008 | Ice | ........................ | G02B 6/4201 385/88 |
| 7,359,646 B2 * | 4/2008 | Kropp | .................. | G02B 6/4204 398/139 |

(Continued)

*Primary Examiner* — Rhonda S Peace (74) *Attorney, Agent, or Firm* — Maschoff Brennan (57) ABSTRACT

One example embodiment includes an optical subassembly (OSA). The OSA includes a leadframe circuit, an optical port, and an active optical component subassembly. The active optical component subassembly is mounted to the leadframe circuit. The optical port is mechanically coupled to the leadframe circuit.

14 Claims, 8 Drawing Sheets

(56) References Cited

U.S. PATENT DOCUMENTS

| | | | | |
|---|---|---|---|---|
| 7,410,306 B2* | 8/2008 | Wipiejewski | G02B 6/4292 | 257/100 |
| 7,410,307 B2* | 8/2008 | Sasser | G02B 6/4206 | 385/88 |
| 7,503,112 B2* | 3/2009 | Ice | H05K 3/3405 | 29/827 |
| 7,540,747 B2* | 6/2009 | Ice | G02B 6/4201 | 439/620.06 |
| 7,562,804 B2* | 7/2009 | Ice | H05K 3/3405 | 228/173.1 |
| 7,567,602 B2* | 7/2009 | Tsuji | G11B 7/127 | 372/34 |
| 7,622,750 B2* | 11/2009 | Fujino | H01S 5/02244 | 257/100 |
| 7,757,929 B2* | 7/2010 | Ice | G02B 6/4246 | 228/180.21 |
| 7,805,084 B2* | 9/2010 | Togami | H04B 10/40 | 385/89 |
| 7,883,278 B2* | 2/2011 | Ueno | G02B 6/4201 | 257/100 |
| 8,049,230 B2* | 11/2011 | Chan | H01L 25/0753 | 257/89 |
| 8,113,725 B2* | 2/2012 | Tagami | G02B 6/4206 | 257/432 |
| 8,175,462 B2* | 5/2012 | Wong | G02B 6/4201 | 398/135 |
| 8,903,246 B2* | 12/2014 | Wieland | G02B 6/4246 | 398/135 |
| 9,070,853 B2* | 6/2015 | Moellmer | H01L 33/483 | |
| 9,337,932 B2* | 5/2016 | Stapleton | H04B 10/40 | |
| 9,709,760 B2* | 7/2017 | Stapleton | H04B 10/40 | |
| 9,831,393 B2* | 11/2017 | Chan | H01L 33/486 | |
| 2003/0231673 A1* | 12/2003 | Uchida | H01S 5/02244 | 372/36 |
| 2004/0101020 A1* | 5/2004 | Bhandarkar | G02B 6/4292 | 372/109 |
| 2006/0045436 A1* | 3/2006 | Wang | G02B 6/4204 | 385/92 |
| 2006/0093283 A1* | 5/2006 | van Haasteren | G02B 6/4204 | 385/92 |
| 2006/0093289 A1* | 5/2006 | Van Haasteren | G02B 6/4204 | 385/93 |
| 2007/0116472 A1* | 5/2007 | Kim, II | H04B 10/2504 | 398/135 |
| 2008/0087991 A1* | 4/2008 | Cheah | H01L 33/62 | 257/666 |
| 2008/0224287 A1* | 9/2008 | Aizpuru | H01L 24/49 | 257/676 |
| 2012/0025210 A1* | 2/2012 | Saeki | H01S 5/02244 | 257/81 |
| 2013/0001410 A1* | 1/2013 | Zhao | H05K 1/0243 | 250/227.11 |
| 2013/0156418 A1* | 6/2013 | Stapleton | H04B 10/40 | 398/25 |
| 2017/0040305 A1* | 2/2017 | Kugiyama | H01L 31/167 | |
| 2018/0011267 A1* | 1/2018 | Lau | G02B 6/4274 | |

* cited by examiner

CHIP ON LEADFRAME OPTICAL SUBASSEMBLY

CROSS-REFERENCE TO RELATED APPLICATION

A claim for benefit of priority to the Jul. 8, 2016 filing date of the U.S. Patent Provisional Application No. 62/359,826, titled "CHIP ON LEADFRAME OPTICAL SUBASSEMBLY" (the '826 Provisional application), is hereby made pursuant to 35 U.S.C. § 119(e). The entire disclosure of the '826 Provisional application is hereby incorporated herein.

BACKGROUND

Embodiments described herein relate generally to optical subassemblies. More particularly, example embodiments relate to chips on a leadframe optical subassemblies.

RELATED TECHNOLOGY

Communication modules, such as electronic or optoelectronic transceivers or transponder modules, are increasingly used in electronic and optoelectronic communication. Communication modules communicate with a host device printed circuit board (PCB) by transmitting and/or receiving electrical data signals to and/or from the host device PCB. The electrical data signals can also be transmitted by the communication module outside a host device as optical and/or electrical data signals. Many communication modules include optical subassemblies (OSAs) such as transmitter optical subassemblies (TOSAs) and/or receiver optical subassemblies (ROSAs) to convert between the electrical and optical domains.

Generally, a ROSA transforms an optical signal received from an optical fiber or another source to an electrical signal that is provided to the host device. A photodiode or similar optical receiver included in the ROSA transforms the optical signal to the electrical signal. A TOSA transforms an electrical signal received from the host device to an optical signal that is transmitted onto an optical fiber or other transmission medium. A laser diode or similar optical transmitter included in the TOSA is driven to emit the optical signal representing the electrical signal received from the host device.

A common configuration for OSAs includes a transistor outline ("TO") package such as a TO can. An example TO can is generally a self-contained and often hermetically sealed canister with one or more optical components disposed within the canister. Specifically, TO cans may incorporate one or more optical components such as an optical transmitter or an optical receiver. The TO can may be configured to fit within a cavity defined in an optical port opposite a second cavity configured to receive an optical fiber. The optical port enables the optical component(s) disposed within the TO can to communicate via the optical fiber. The TO can may further include electrical contacts that allow the optical component(s) to communicate with a host device electrically coupled to the OSA. However, the TO can increases the number of components required to produce an OSA, which increases manufacturing costs and may create electrical discontinuities.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF EXEMPLARY EMBODIMENTS

This Summary is provided to introduce a selection of concepts in a simplified form that are further described below. This Summary is not intended to identify key features or essential characteristics of the claimed subject matter, nor is it intended to be used as an aid in determining the scope of the claimed subject matter.

One example embodiment includes an optical subassembly (OSA). The OSA includes a leadframe circuit, an optical port, and an active optical component subassembly. The optical port defines a barrel cavity and the optical port is mechanically coupled to the leadframe circuit. The active optical component subassembly is positioned within the barrel cavity and electrically coupled to the leadframe circuit.

Another example embodiment includes an OSA. The OSA includes a leadframe circuit and an active optical component subassembly. The leadframe circuit includes a leadframe pad and a plurality of leads. The active optical component subassembly is mechanically coupled to the leadframe pad and electrically coupled to at least a portion of the plurality of leads.

Another embodiment includes a method including mechanically coupling an active optical component subassembly to a leadframe circuit. The method further includes electrically coupling the active optical component subassembly to the leadframe circuit.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Embodiments described herein relate generally to optical subassemblies (OSA). More particularly, some example embodiments relate to a chip on a leadframe optical sub assembly (COL OSA) in which an active optical component and/or a housing containing the active optical component are mounted to a leadframe circuit. In some embodiments, the COL OSA includes an active optical component subassembly that includes an optical transmitter, a monitor photodiode ("monitor PD"), a spacer/heat dissipater, and a plate. In this embodiment, the optical transmitter, the monitor PD, and the spacer/heat dissipater are mounted to a leadframe circuit and may be disposed within a barrel cavity of an optical port. The plate may be fixed in the barrel cavity.

Alternately or additionally, a COL OSA may include a ROSA active optical component subassembly including a photodiode and an amplifier. In these and other embodiments, the amplifier and/or the photodiode may be mounted to a leadframe circuit and disposed within a barrel cavity of an optical port.

Some embodiments of the COL OSA described herein may include a lower part count than OSAs that include a TO can. Thus, construction of the COL OSA may include fewer steps than construction of OSAs with the TO can. Additionally or alternately, the COL OSA may use leadframe packaging and design techniques for OSA improvements. Typically, metal leads on leadframes need to be very short in order to transmit high-speed signals. The COL OSA may enable longer metal leads to be used while maintaining the ability to transmit high-speed signals.

Embodiments described herein may be implemented in optoelectronic devices. As used herein, the term "optoelectronic device" includes a device having both optical and electrical components. Examples of optoelectronic devices include, but are not limited to transponders, transceivers, transmitters, and/or receivers. While some embodiments described herein will be discussed in the context of a transceiver module, those of skill in the art will recognize that the principles of the present invention may be implemented in virtually any device having some or all of the functionality described below.

Figure 1A:
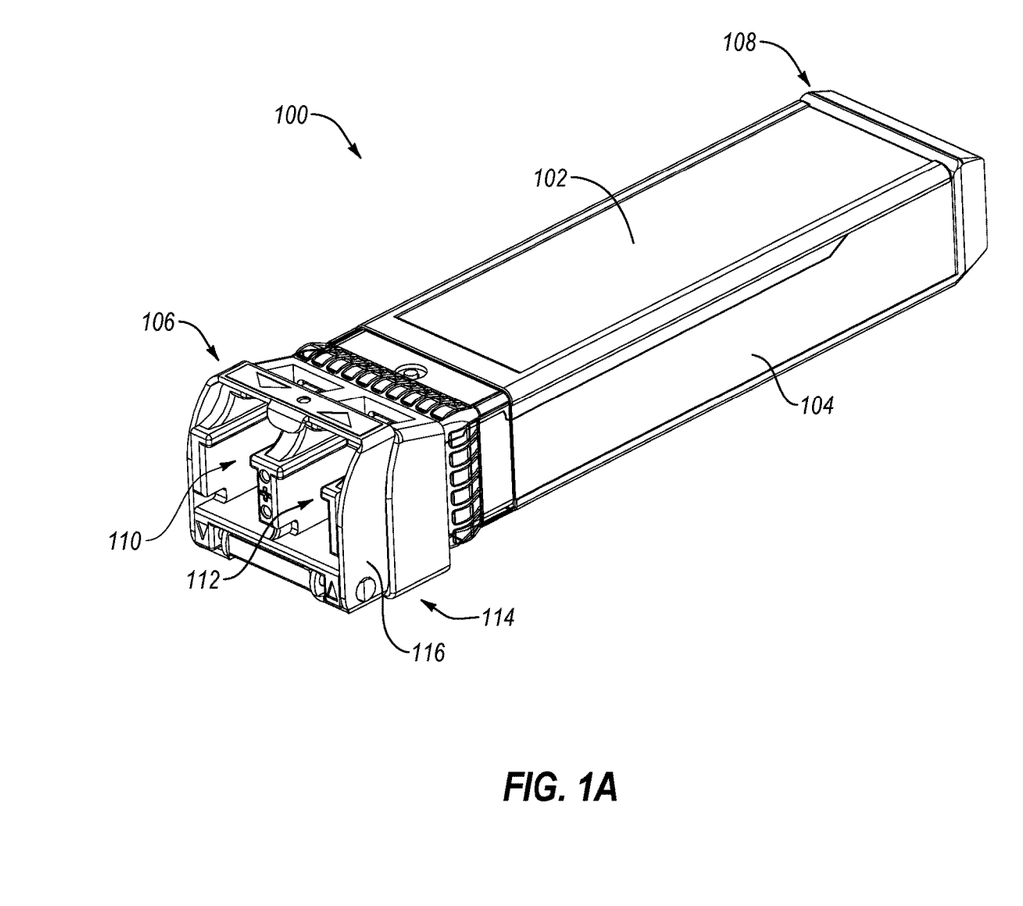
FIG. 1A illustrates a perspective view of an example transceiver in which an embodiment disclosed herein may be implemented.

FIG. 1A illustrates a perspective view of an example transceiver module generally designated as transceiver 100 in which a COL OSA may be implemented. The transceiver 100 can be an SFP+ optical transceiver in some embodiments. While described in some detail herein, the transceiver 100 is discussed by way of illustration only, and not by way of restricting the scope of the invention. For example, although the transceiver 100 can be an SFP+ optical transceiver in some embodiments, the principles of the invention can be implemented in optoelectronic modules of any form factor such as XFP, SFP, SFP+, SFF, XENPAK, and XPAK, without restriction. Alternatively or additionally, the transceiver 100 can be suitable for optical signal transmission and reception at a variety of per-second data rates, including but not limited to 1 gigabit per second (Gbit), 2 Gbit, 4 Gbit, 8 Gbit, 10 Gbit, 14 Gbit, 20 Gbit or other bandwidth fiber optic links. Furthermore, optoelectronic modules of other types and configurations, or having components that differ in some respects from those shown and described herein, can also benefit from the principles disclosed herein.

As shown in FIG. 1A, the transceiver 100 includes a body composed of a top shell 102 and a bottom shell 104. The bottom shell 104 defines a front end 106 and a back end 108 of the transceiver 100. Included on the front end 106 of the transceiver 100 are two fiber openings 110, 112 configured to receive connectors of an optical fiber (not shown). The two fiber openings 110, 112 include an output fiber opening 110 and an input fiber opening 112. The fiber openings 110, 112 define a portion of an interface portion 114 that is generally included on the front end 106 of the transceiver 100. The interface portion 114 can include structures to operably connect the transceiver 100 to optical fibers or optical fiber connectors such as, but not limited to, LC connectors.

Also disposed on the front end 106 of the transceiver 100 is a bail latch assembly 116 that enables the transceiver 100 to be removably secured in a host device (not shown). The body of the transceiver 100, including the top shell 102 and the bottom shell 104, can be formed of metal. Alternately or additionally, the host device may include a cage in which the transceiver 100 is inserted.

Figure 1B:
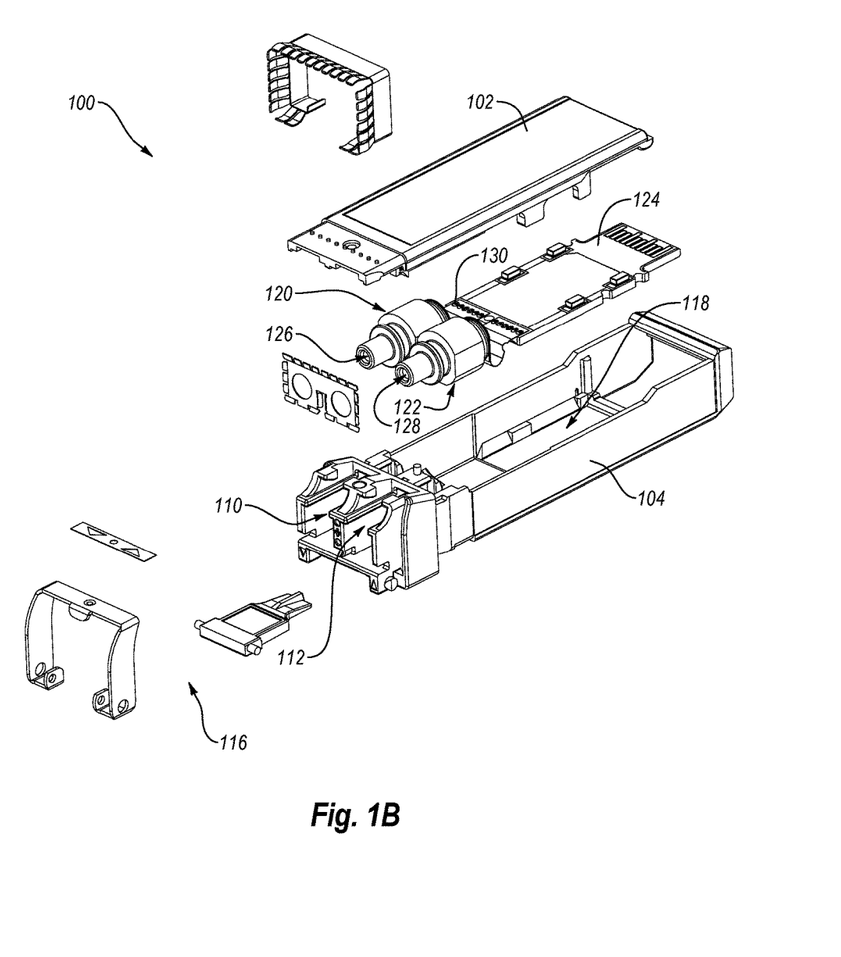
FIG. 1B illustrates an exploded perspective view of the transceiver of FIG. 1A.

FIG. 1B illustrates a partially exploded perspective view of the transceiver 100 of FIG. 1A. In FIG. 1B, the bottom shell 104 defines a cavity 118 in which a TOSA 120, a ROSA 122, a printed circuit board (PCB) 124, and PCB electrical connectors 130 are included as internal components of the transceiver 100.

Each of the TOSA 120 and the ROSA 122 includes a fiber receiver 126 and 128, respectively, that extends into a respective one of the fiber openings 110, 112 so as to be positioned to mate with an optical fiber (not shown) or a connector portion (not shown) of the optical fiber when received within the fiber openings 110, 112. The TOSA 120 and the ROSA 122 can be electrically coupled to the PCB 124 via the PCB electric connectors 130. The PCB electric connectors 130 may include a leadframe connector or equivalent electrical contact(s) that allow the transmission of electrical signals between the PCB 124 and the TOSA 120 or ROSA 122.

During operation, the transceiver 100 can receive a data-carrying electrical signal from a host device, which can be any computing system capable of communicating with the transceiver 100, for transmission as a data-carrying optical signal on to an optical fiber (not shown). The electrical signal can be provided to an optical transmitter, such as a laser disposed within the TOSA 120, which converts the electrical signal into a data-carrying optical signal for emission on to an optical fiber and transmission via an optical communication network, for instance. The optical transmitter can include an edge-emitting laser diode, a Fabry-Perot ("FP") laser, a vertical cavity surface emitting laser ("VCSEL"), a distributed feedback ("DFB") laser, or other suitable light source. Accordingly, the TOSA 120 can serve or include components that serve as an electro-optic transducer.

In addition, the transceiver 100 can receive a data-carrying optical signal from an optical fiber via the ROSA 122. The ROSA 122 can include an optical receiver, such as a PIN photodiode, an avalanche photodiode ("APD"), or other suitable receiver, which transforms the received optical signal into a data-carrying electrical signal. Accordingly, the ROSA 122 can serve or include components that serve as an optoelectric transducer. The resulting electrical signal can then be provided to the host device in which the transceiver 100 is located.

Chip on Leadframe Optical Subassembly

Figure 2A:
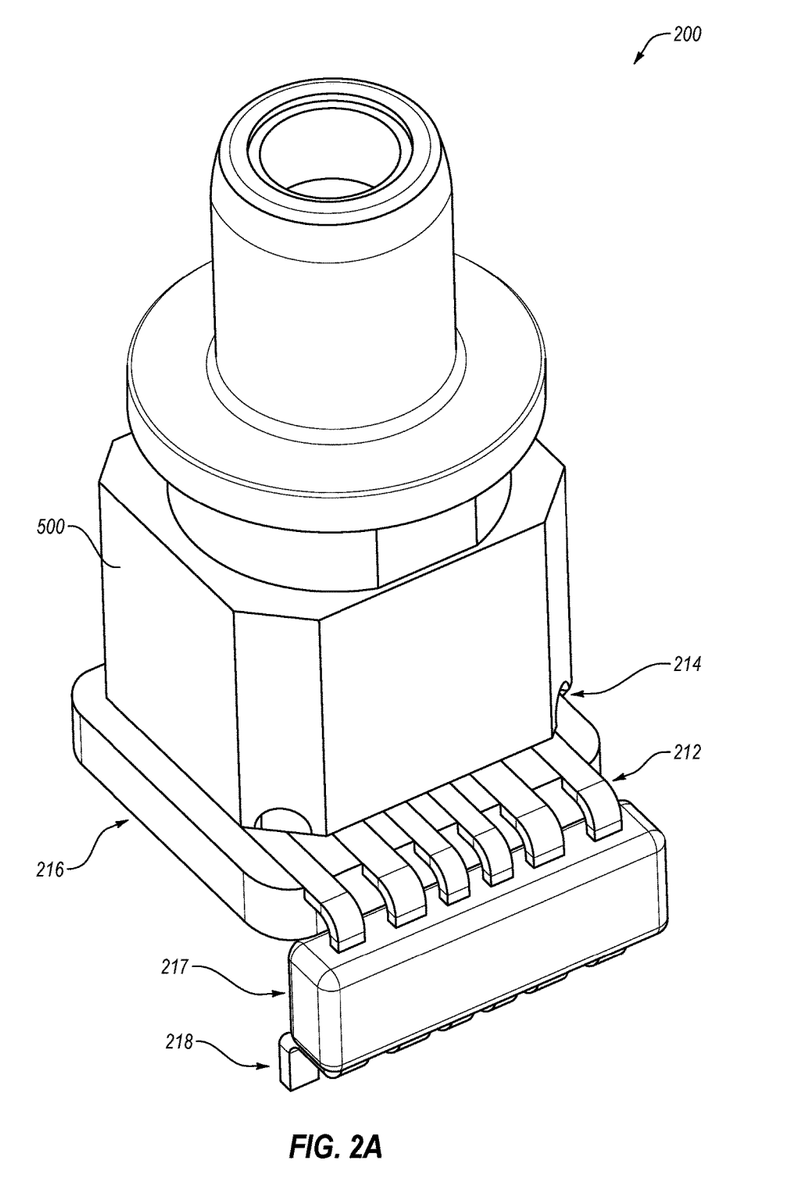
FIGS. 2A-2B illustrate an example chip on leadframe optical subassembly (COL OSA) that may be implemented in the transceiver of FIGS. 1A and 1B.
Figure 2B:
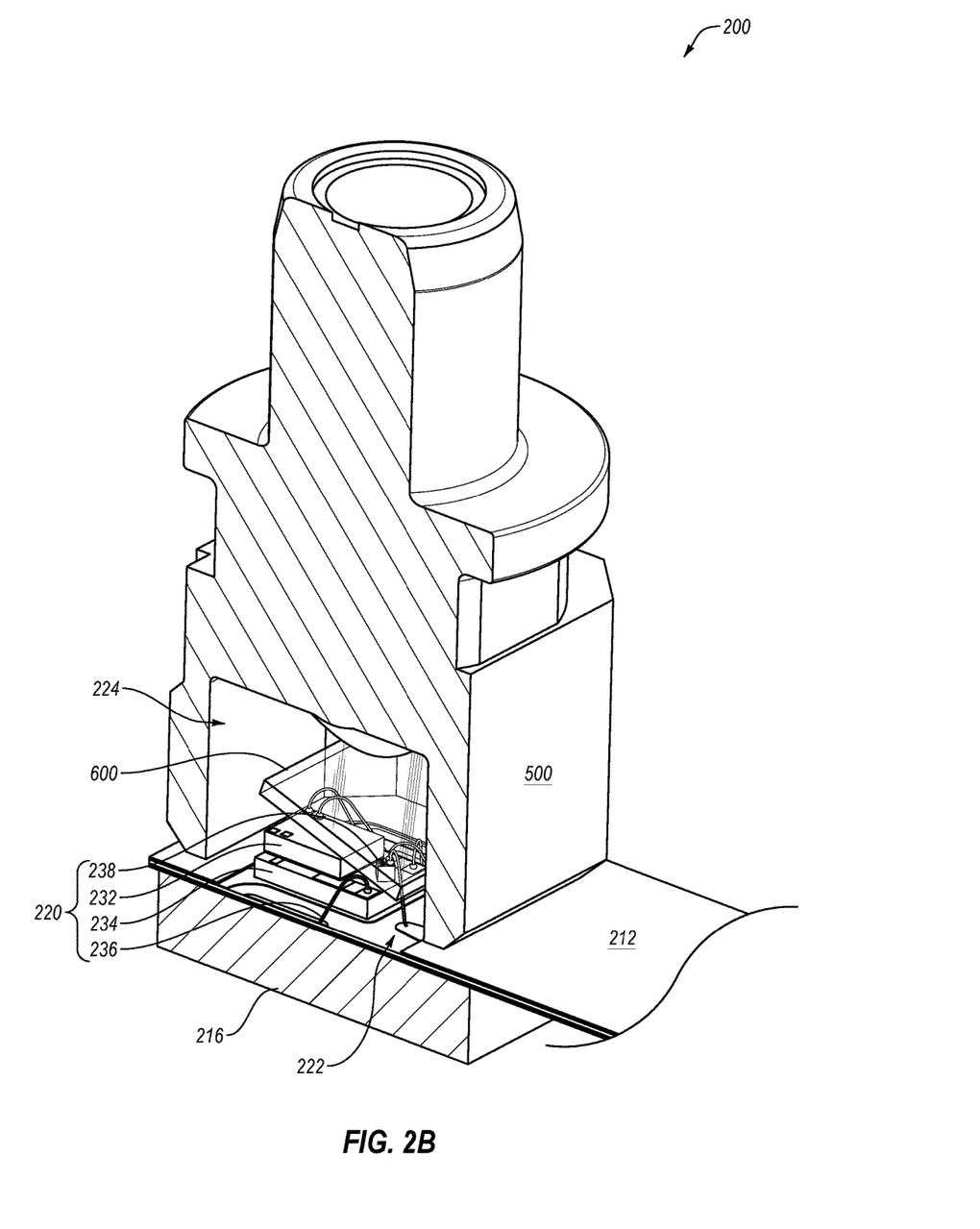

FIGS. 2A-2B illustrate an example COL OSA 200. Specifically, FIG. 2A illustrates an assembled, perspective view of the COL OSA 200 and FIG. 2B illustrates a detailed cut-away perspective view of the COL OSA 200. The COL OSA 200 may generally correspond to the TOSA 120 or ROSA 122 described with reference to FIG. 1B, for instance.

With combined reference to FIGS. 2A-2B, the COL OSA 200 can include an optical port 500, a leadframe circuit 212, a first casing 216, a second casing 217, a leadframe connection 218, an active optical component subassembly 220 (FIG. 2B), and a leadframe connection 214.

The COL OSA 200 is generally configured to convert electrical signals to optical signals and/or optical signals to electrical signals and to at least partially communicate the signals (i.e., electrical or optical signals) within an optoelectric system, such as the transceiver 100 of FIGS. 1A-1B. More specifically, the active optical component subassembly 220 may include one or more components configured to perform conversions as described above. Additionally, the active optical component subassembly 220 may include one or more components that modify, monitor, amplify, and/or attenuate the signals. For example the components may modify, monitor, amplify, and/or attenuate the signals to conform to operating capabilities of a system implementing the COL OSA 200.

Specifically, two example functions of the COL OSA 200 can include transmission of optical signals and reception of optical signals. The transmission of optical signals can be accomplished if the active optical component subassembly 220 includes an optical transmitter. In this and other embodiments, electrical signals are received on the leadframe circuit 212 at the leadframe connection 218 from a PCB such as the PCB 124 of FIG. 1B. The electrical signals are communicated along the leadframe circuit 212 to the active optical component subassembly 220 where the electrical signals are converted to optical signals and transmitted from the COL OSA 200 through the optical port 500.

The reception of optical signals can be accomplished if the active optical component subassembly 220 includes an optical receiver such as a photodetector. In this and other embodiments, optical signals are received through the optical port 500, converted to electrical signals by the active optical component subassembly 220 and communicated along the leadframe circuit 212 to the leadframe connector 218.

With specific reference to FIGS. 2A and 2B, the COL OSA 200 is depicted as assembled. When assembled, the optical port 500 is attached to the leadframe circuit 212 at a leadframe connection 214. The leadframe circuit 212 can be a leadframe formed, for example, by etching, stamping, or printing a circuit that generally includes conductive elements. In some embodiments, the conductive elements are formed from flat sheets usually made out of either copper or iron-nickel alloys (e.g., alloy 42) that demonstrate very low expansion rate at room temperature. The alloy sheet may be coated with photoresist film, exposed and etched using conventional processes. Alternatively, the flat metal sheet can be stamped using a die-and-punch set to create the desired geometries. Also, printing techniques, such as 3D printing can also be used to form the desired geometries.

The leadframe connection 214 refers to the connection between the optical port 500 and the leadframe circuit 212. The leadframe connection 214 can include a mechanical connection between the optical port 500 and the leadframe circuit 212.

The PCB leadframe connection 218 (FIG. 2A) can include electrical contacts that are configured to be electrically coupled with a PCB such as the PCB 124 in FIG. 1B. The PCB 124 may be electrically coupled to the leadframe circuit 212 via the PCB leadframe connection 218 at the PCB connectors 130. A connection between the leadframe circuit 212 and the PCB 124 at the PCB leadframe connection 218 can be realized by a mechanized soldering process, a hand soldering process, or a hot bar process, for example.

Referring next to FIG. 2B, a cut-away view of the COL OSA 200 is illustrated. As shown in FIG. 2B, the COL OSA 200 can include the active optical component subassembly 220 positioned within the optical port 500. As discussed above, the active optical component subassembly 220 can include one or more optical or electrical components that enable operation of the COL OSA 200. For example, the active optical component subassembly 220 can include one or more optoelectric components that may be included in a TOSA, such as the TOSA 120 of FIG. 1B. The embodiment depicted in FIG. 2B includes optoelectric components that may be included in a TOSA. Specifically, in this and other embodiments, the active optical component subassembly 220 can include a plate 600, which is depicted transparently in FIG. 2B, a monitor PD 232, a spacer/heat spreader 234, wirebonds 236, and an optical transmitter 238 as described below.

Referring to FIG. 2B, the active optical component subassembly 220 can be configured to fit inside a barrel cavity 224 when the COL OSA 200 is assembled. Additionally, one or more optical or electrical components included in the active optical component subassembly 220 may be mounted to the leadframe circuit 212 at an optical component subassembly connection region ("connection region") 222. Similar to the leadframe connection 214, the connection region 222 may include electrical connections and mechanical connections. Examples of the electrical connections may include wire bonding between one or more electrical contacts of the active optical component subassembly 220 and the conductive elements of the leadframe circuit 212. The electrical connections may include one or more wirebonds 236. Wire bonding can be performed by micro-welding, thermo-compression wire bonding, or similar wire bonding processes. Example wirebonds can be composed at least partially of aluminum, copper, gold, any combination thereof or any combination thereof with other materials.

The active optical component subassembly 220 may be configured to be positioned and/or fixed within the barrel cavity 224. In some embodiments, some components included in the active optical component subassembly 220 are mounted to the leadframe circuit 212 and other components included in the active optical component subassembly 220 are fixed within the barrel cavity 224.

For example, the active optical component subassembly 220 can include the plate 600, the monitor PD 232, the spacer/heat spreader 234, one or more wirebonds 236, and the optical transmitter 238, which may include a light-emitting diode, a VCSEL, or the like. The plate 600 may be fixed in the barrel cavity 224 while the other components included in the active optical component subassembly 220 such as the monitor PD 232, the spacer/heat spreader 234, and the optical transmitter 238 may be mounted to the leadframe circuit 212 at the connection region 222. More specifically in this and other embodiments, the spacer/heat spreader 234 is mounted to the leadframe circuit 212 at the connection region 222. The optical transmitter 238 and the monitor PD 232 can be operably connected to the spacer/heat spreader 234. The connection region 222 may be configured to mechanically receive the spacer/heat spreader 234 and to secure the optical transmitter 238 physically at a specific position enabling alignment of the optical transmitter 238 and the monitor PD 232 within the optical port 500. The connection region 222 may be further configured to electrically connect the optical transmitter 238 and the monitor PD 232 to a system implementing the COL OSA 200, such as the transceiver 100 of FIGS. 1A-1B.

Figure 3:
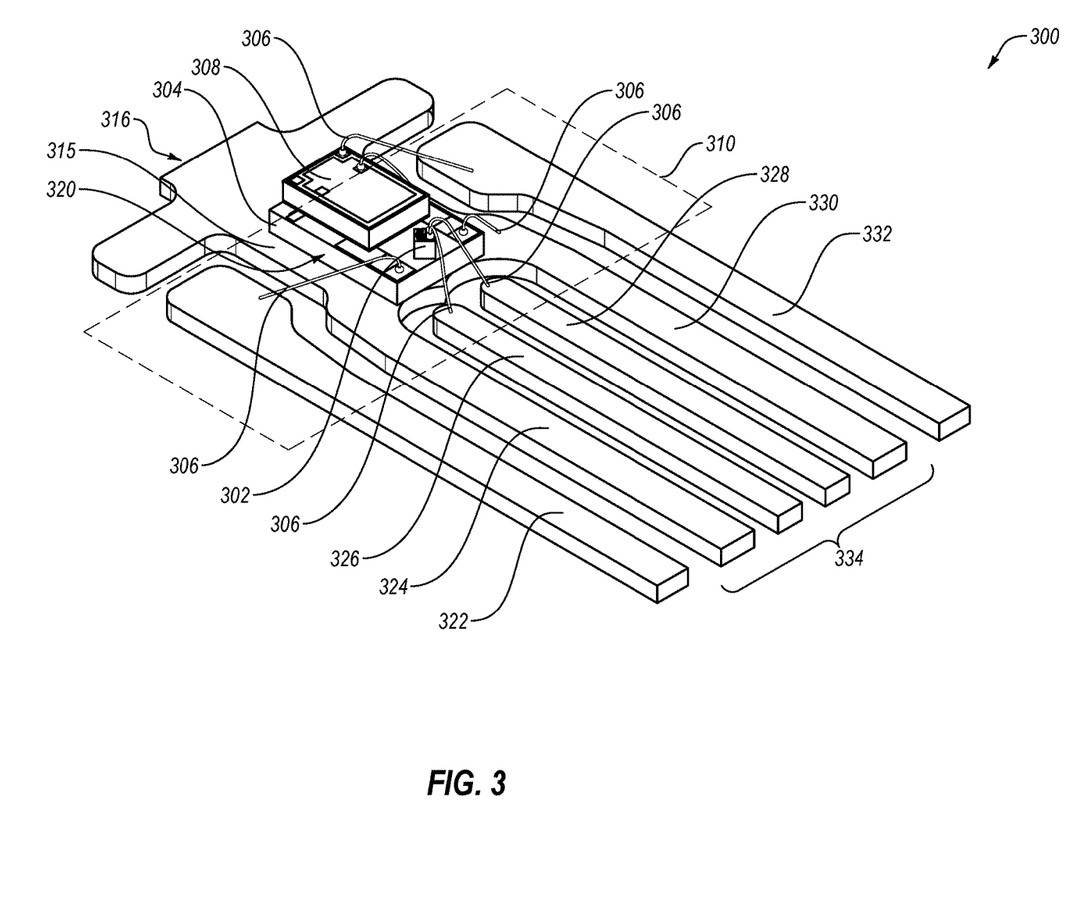
FIG. 3 illustrates an example active optical component subassembly.

FIG. 3 illustrates an example active optical component subassembly 300 which may be implemented in the COL OSA 200 of FIGS. 2A-2B. Similar to the active optical component subassembly 220 depicted in FIG. 2B, the active optical component subassembly 300 can include an optical transmitter 302, a spacer/heat spreader 304, wirebonds 306, and a monitor PD 308 (the optical transmitter 302, the spacer/heat spreader 304, and the monitor PD 308 are referred to as the "components 302/304/308" and collectively as "component assembly 320" with reference to FIG. 3). The components 302/304/308 are not limiting to the scope of the invention. For example, additional or alternative components that may be included in the active optical component subassembly 300 and/or elsewhere in the COL OSA including the active optical component subassembly 300. The additional or alternative components may include, but are not limited to, an optical filter, a resistor, a capacitor, integrated circuits (ICs) such as a laser driver IC and/or a post amplifier IC, or the like or any combination thereof. The optical transmitter 302 can include, but is not limited to, a VCSEL, a laser diode, an edge emitting laser, an FP laser, a DFB laser, or other suitable optical transmitter.

In the embodiment depicted in FIG. 3, an optical port has been omitted for clarity and the components 302/304/308 are illustrated affixed to a subassembly pad 315 in a connection region 310. The active optical component subassembly 300 is configured to be positioned within and fit inside a barrel cavity of the omitted optical port. The barrel cavity can be similar to the barrel cavity 224 depicted in FIG. 2B, for instance.

The component assembly 320 is secured to a leadframe pad 315 of the leadframe 316 in the connection region 310 through a mechanical connection. An example mechanical connection may be created through use of an epoxy, a glue, a fastener, or a solder. Generally, the mechanical connection enables the proper positioning of the component assembly 320 within a COL OSA such that a transmitted optical signal is aligned for function of the COL OSA.

The leadframe 316 further includes a plurality of leads 322-332. The optical transmitter 302 receives electrical signals from one or more the leads 322-332 via one or more wirebonds 306 that drive the optical transmitter 302 to emit optical signals representative of the electrical signals.

The monitor PD 308 may be electrically coupled to one or more of the leads 322-332 in the connection region 310 via one or more of the wirebonds 306. Functionally, the monitor PD 308 may be configured to receive a portion of an optical signal reflected from a plate. The monitor PD 308 may be further configured to convert the reflected portion to an electrical signal which is communicated to another system. Accordingly, and as illustrated in FIG. 3, the monitor PD 308 may be electrically coupled to at least one of the leads 322-332 in the connection region 310 via one or more of the wirebonds 306. The wirebonds 306 carry the electrical signals from the monitor PD 308 to one or more leads 322-332 in the connection region 310, which may be electrically coupled to another system.

In another embodiment as further illustrated in FIG. 3, a specific arrangement of signals from the component assembly 320 to the leads 322-332 is further illustrated. Conventionally, the length of leads on a leadframe were necessarily required to be very short in length in order to transmit high-speed signals. In one embodiment, at least a portion of leads 322-332 are coupled via wirebonds 306 to the optical transmitter 302 in a configuration where the portion of the leads 322-332 can operate as ground-signal-signal-ground (GSSG) transmission lines 334. Specifically, leads 326 and 328 are coupled via wirebonds 306 to signals from the optical transmitter 302 and leads 324 and 330 are coupled via wirebonds 306 to ground. The GSSG transmission lines 334 enable high-speed signal transmission with very long metal leads 324-330 of the leadframe 316. The COL OSA configuration enables a direction connection with the PCB 124 in FIG. 1B without requiring an intermediate connection medium such as a flex circuit. Therefore, the COL OSA may reduce costs and assembly time.

Figure 4:
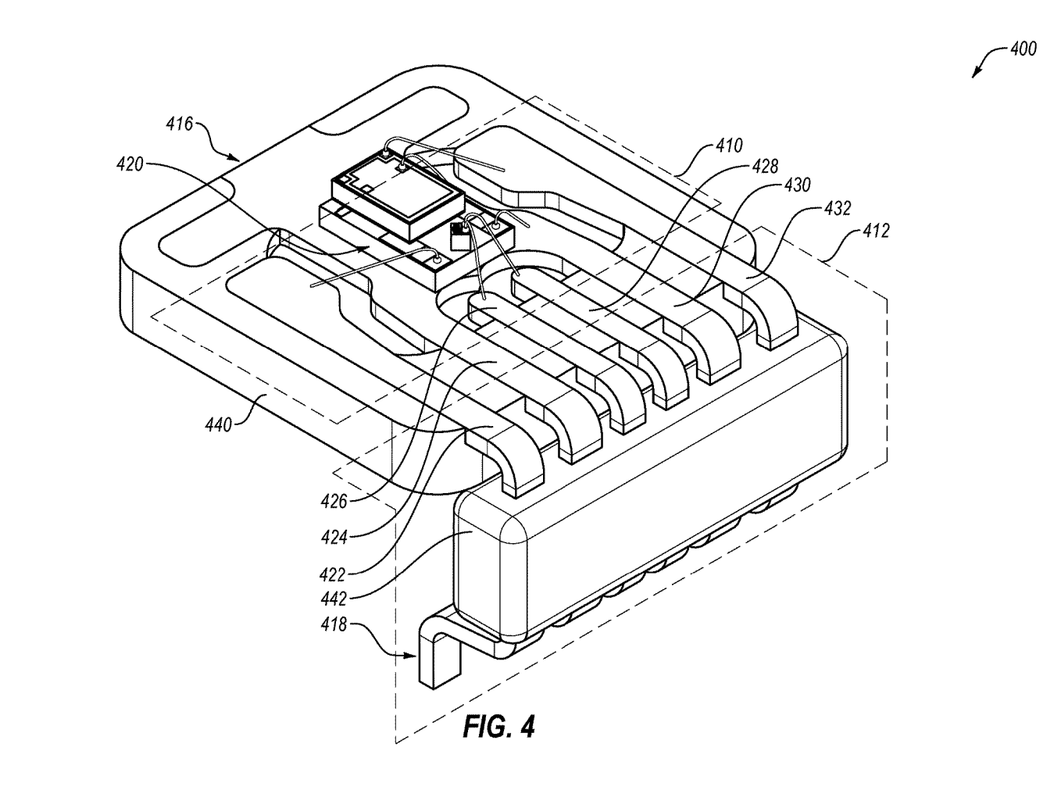
FIG. 4 illustrates an example active optical component subassembly.

FIG. 4 illustrates an active optical component subassembly 400 configured to be positioned within and fit inside a barrel cavity of the omitted optical port. Similar to the active optical component subassembly 220 and 300 respectively depicted in FIGS. 2B and 3, the active optical component subassembly 400 can include a leadframe 416 and a component assembly 420. The leadframe 416 can include a connection region 410 and a lead region 412. FIG. 4 illustrates the two pieces assembled in one exemplary operational configuration after the process used to dispose the conductors or leads within the casing. At least the connection region 410 includes a first casing 440 and a second casing 442 that each can support a portion of leads 422-432.

In one exemplary use of the active optical component subassembly 400, the first casing 440 and the second casing 442 can be coplanar during the manufacturing process. The two casings 440, 442 and the leads 442-432 can be generally aligned in parallel planes, optionally co-planar, during the manufacturing process, with the second casing 442 orientated relative to the first casing 440 during the assembly process. The leads 422-432 can then be manipulated or bent to the desired configuration at a location between the first casing 440 and the second casing 442 as part of the assembly process.

In exemplary embodiments, the first and second casings 440, 442 of the active optical component subassembly 400, can be fabricated using an injection molding process, a transfer molding process, or other molding processes known to those of skill in the art. The casings 440 and 442 can generally be made from a polymer, synthetic material, or other material capable of functioning as a dielectric or insulator. Various types of plastics, such as, but not limited to, Liquid Crystal Polymers (LCP) and Polyetherimide (PEI), can be used in this application.

Figure 5:
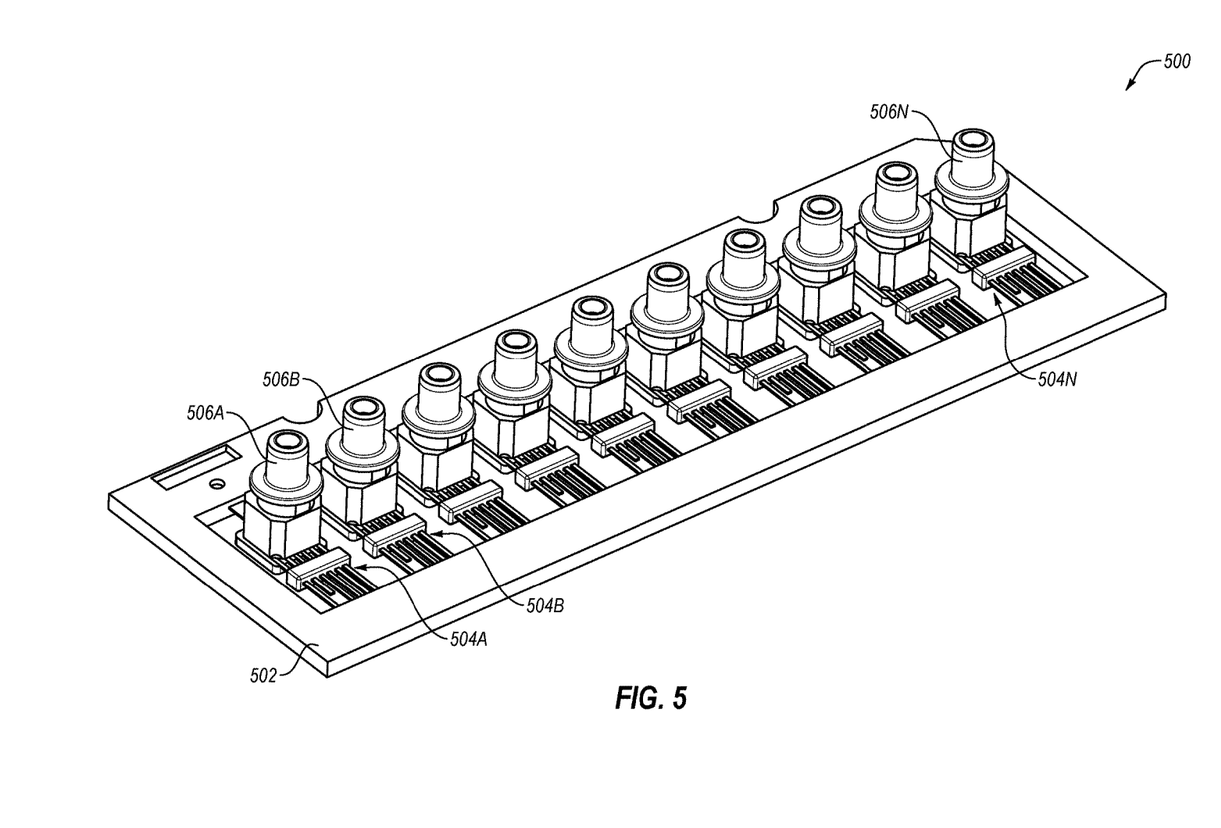
FIG. 5 illustrates an example construction process of an array of COL OSAs.

FIG. 5 illustrates an example array 500 of COL OSAs. The array 500 includes a leadframe strip 502 that includes a gridwork of interconnected leadframes 504. A respective plurality of component assemblies (not visible) 320 of FIG. 3 are assembled onto respective leadframe pads (not visible) 315 of FIG. 3. The plurality of component assemblies 320 are then wirebonded to respective leads of the leadframes 504. The casing, as described above with respect to FIG. 4, can be applied. A respective optical port 506 is further mounted on the wirebonded component assemblies 320 with the active optical component subassemblies positioned within the optical ports. From the leadframe strip 502, individual OSAs may be cut.

Some advantages of the embodiments of the construction process described herein may include, but are not limited to, simultaneous manufacture/assembly of an array COL OSAs, the ability to concurrently and/or simultaneously burn-in and/or otherwise test the COL OSAs, or the like or any combination thereof. Alternately or additionally, some embodiments described herein may dispense quick cure tack and/or structural adhesive in a single step for securing separate parts together.

Figure 6:
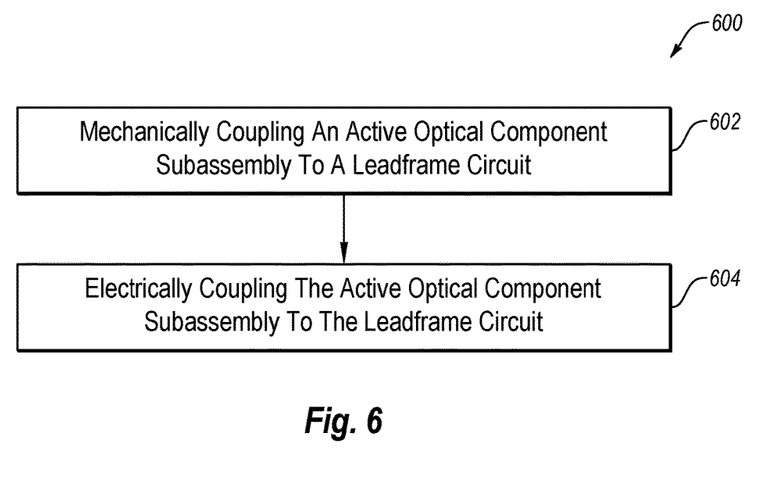
FIG. 6 is a flow chart of an example method of constructing a chip on leadframe optical subassemblies, arranged in accordance with at least some embodiments described herein.

FIG. 6 is a flow chart of an example method 600 of constructing a chip on leadframe optical subassemblies, arranged in accordance with at least some embodiments described herein. The method 600 may begin at 602 by mechanically coupling an active optical component subassembly to a leadframe circuit.

At 604, the method includes electrically coupling the active optical component subassembly to the leadframe circuit.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical subassembly comprising:
    a leadframe circuit including a substantially parallel plurality of leads with at least a portion of the plurality of leads arranged as ground-signal-signal-ground (GSSG) transmission lines, the substantially parallel plurality of leads having first ends forming a connection region and second ends forming a respective plurality of leadframe connectors, the substantially parallel plurality of leads configured as GSSG transmission lines from the connection region to the second ends and the substantially parallel plurality of leads further configured with at least one bend between the connection region and the second ends with the at least one bend causing at least a portion of the substantially parallel plurality of leads to be substantially orthogonal to the connection region, the plurality of leadframe connectors configured for directly coupling to a respective plurality of printed circuit board connectors;
    an optical port defining a barrel cavity extending along an axis, the optical port mechanically coupled around the connection region of the leadframe circuit; and
    an active optical component subassembly positioned within the barrel cavity and substantially coplanar with the connection region of the leadframe, the active optical subassembly mechanically and electrically coupled to the leadframe circuit in the connection region, and wherein the active optical component subassembly electrically couples through wirebonds to the optical component subassembly connection regions of the leadframe circuit, the connection region of the leadframe and the active optical component both configured substantially orthogonal to the axis of the barrel cavity, and the plurality of leadframe connectors extending from the connection region continuing to be substantially orthogonal to the axis of the barrel cavity for a portion of the length of the plurality of leadframe connectors.

2. The optical subassembly of claim 1, wherein the active optical component subassembly comprises an optical transmitter.

3. The optical subassembly of claim 2, wherein the optical transmitter comprises a vertical cavity surface emitting laser (VCSEL).

4. The optical subassembly of claim 3, wherein the active optical component subassembly comprises a monitor photodiode and a spacer/heat dissipater, the spacer heat/dissipater being directly mounted to the leadframe circuit at a connection region and the monitor photodiode and the VCSEL being mounted to a spacer top surface of the spacer heat/dissipater.

5. The optical subassembly of claim 1, wherein the leadframe circuit comprises a leadframe pad in the connection region of the leadframe circuit.

6. The optical subassembly of claim 5, further comprising a first casing formed about the leadframe pad of the leadframe circuit opposite the active optical component subassembly.

7. The optical subassembly of claim 6, further comprising a second casing formed about the plurality of leads of the leadframe circuit.

8. The optical subassembly of claim 1, wherein the connection region of the leadframe circuit is configured to communicate electrical signals between a host system and the active optical component subassembly.

9. An optical subassembly comprising:
    a leadframe circuit including a substantially parallel plurality of leads with at least a portion of the plurality of leads arranged as ground-signal-signal-ground (GSSG) transmission lines, the substantially parallel plurality of leads having first ends forming a connection region including a leadframe pad and second ends forming a respective plurality of leadframe connectors, the substantially parallel plurality of leads configured as GSSG transmission lines from the connection region to the second ends and the substantially parallel plurality of leads further configured with at least one bend between the connection region and the second ends with the at least one bend causing at least a portion of the substantially parallel plurality of leads to be substantially orthogonal to the connection region, the plurality of leadframe connectors configured for directly coupling to a respective plurality of printed circuit board connectors; and
    an active optical component subassembly at least mechanically coupled around the connection region of the leadframe pad and substantially coplanar with the connection region of the leadframe, the active optical subassembly electrically coupled to at least a portion of the plurality of leads and arranged to transmit or receive with a fiber along an axis substantially orthogonal to the active optical subassembly, wherein the active optical component subassembly is electrically coupled through wirebonds to the at least a portion of the plurality of leads, the connection region of the leadframe and the active optical component both configured substantially orthogonal to the axis, and the plurality of leadframe connectors extending from the connection region continuing to be substantially orthogonal to the axis for a portion of the length of the plurality of leadframe connectors.

10. The optical subassembly of claim 9, further comprising a first casing formed about the leadframe pad of the leadframe circuit opposite the active optical component subassembly.

11. The optical subassembly of claim 10, further comprising a second casing formed about the leads of the leadframe circuit.

12. A method, comprising:
    mechanically coupling an active optical component subassembly around a connection region of a leadframe circuit, the active optical component subassembly substantially coplanar with the connection region of the leadframe, the leadframe circuit including a substantially parallel plurality of leads with at least a portion of the plurality of leads arranged as ground-signal-signal-ground (GSSG) transmission lines, the substantially parallel plurality of leads having first ends forming the connection region and second ends forming a respective plurality of leadframe connectors, the substantially parallel plurality of leads configured as GSSG transmission lines from the connection region to the second ends and the substantially parallel plurality of leads further configured with at least one bend between the connection region and the second ends with the at least one bend causing at least a portion of the substantially parallel plurality of leads to be substantially orthogonal to the connection region, the plurality of leadframe connectors configured for directly coupling to a respective plurality of printed circuit board connectors; and electrically coupling the active optical component subassembly to the leadframe circuit in the connection region and arranged to transmit or receive with a fiber along an axis substantially orthogonal to the active optical subassembly, wherein the electrically coupling comprises wirebonding the active optical component subassembly to at least a portion of a plurality of leads on the leadframe circuit, the connection region of the leadframe and the active optical component both configured substantially orthogonal to the axis, and the plurality of leadframe connectors extending from the connection region continuing to be substantially orthogonal to the axis for a portion of the length of the plurality of leadframe connectors.

13. The method of claim 12, further comprising mounting an optical port over the active optical component subassembly and to the leadframe circuit.

14. The method of claim 12, further comprising forming casing around at least a portion of the leadframe circuit.

\* \* \* \* \*